US008515589B2

(12) United States Patent
Haugh et al.

(10) Patent No.: US 8,515,589 B2
(45) Date of Patent: Aug. 20, 2013

(54) DYNAMIC COOLING SYSTEM FOR ELECTRONIC DEVICE WITH AIR FLOW PATH CHANGES

(75) Inventors: Julianne F. Haugh, Austin, TX (US); Jeffrey Bart Jennings, Davis, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/949,907

(22) Filed: Nov. 19, 2010

(65) Prior Publication Data

US 2012/0130545 A1     May 24, 2012

(51) Int. Cl.
*G06F 19/00*     (2011.01)
(52) U.S. Cl.
USPC ............. 700/300; 700/276; 62/186; 361/692; 361/704; 236/49.3
(58) Field of Classification Search
USPC ................... 700/276, 300; 62/186; 361/687, 361/704; 236/49.3
See application file for complete search history.

(56) References Cited

U.S. PATENT DOCUMENTS

| | | | | |
|---|---|---|---|---|
| 4,775,001 A | * | 10/1988 | Ward et al. | 165/214 |
| 4,960,041 A | * | 10/1990 | Kiser | 454/238 |
| 5,796,580 A | * | 8/1998 | Komatsu et al. | 361/679.48 |
| 6,515,857 B2 | | 2/2003 | Ford | |
| 6,692,349 B1 | * | 2/2004 | Brinkerhoff et al. | 454/256 |
| 6,792,766 B2 | * | 9/2004 | Osborne et al. | 62/159 |
| 6,983,889 B2 | * | 1/2006 | Alles | 236/49.1 |
| 6,997,390 B2 | * | 2/2006 | Alles | 236/49.4 |
| 7,226,353 B2 | | 6/2007 | Bettridge | |
| 7,290,401 B2 | * | 11/2007 | Hermerding | 62/186 |
| 2004/0067731 A1 | * | 4/2004 | Brinkerhoff et al. | 454/325 |
| 2005/0116055 A1 | * | 6/2005 | Alles | 236/49.1 |
| 2005/0162832 A1 | | 7/2005 | Muller | |
| 2008/0041077 A1 | * | 2/2008 | Tutunoglu | 62/186 |
| 2008/0283114 A1 | | 11/2008 | Gray | |
| 2009/0325051 A1 | | 12/2009 | Niedzwiecki | |
| 2009/0325055 A1 | | 12/2009 | Koetting | |
| 2012/0130545 A1 | * | 5/2012 | Haugh et al. | 700/276 |

* cited by examiner

*Primary Examiner* — Michael D Masinick
(74) *Attorney, Agent, or Firm* — David A. Mims, Jr.; Robert J. Wilder

(57) ABSTRACT

A method, programmed medium and system are provided for altering the airflow through an electronic device such as a laptop computer in response to overheating, and feedback about the state of use of a laptop computer. In an exemplary embodiment, a laptop case is constructed such that it has an alternate opening for each intake and/or exhaust port. The primary intake and/or exhaust port is located such that it does not interfere with the user while the laptop is being operated normally. When it is detected that an intake and/or exhaust port is potentially blocked, it is determined whether or not the laptop is actively being used. If the laptop is not being used when an overheated condition is detected, a predetermined action is taken to change the air input/output air flow through an alternate exhaust path. If the laptop is being used, other actions, in terms of altering airflow, may take place, such as enabling a user to selectively choose a different airflow path from a plurality of airflow paths available within the electronic device being cooled.

20 Claims, 4 Drawing Sheets

DYNAMIC COOLING SYSTEM FOR ELECTRONIC DEVICE WITH AIR FLOW PATH CHANGES

FIELD OF THE INVENTION

The present invention relates generally to information processing systems and more particularly to a methodology and implementation for enabling selective area air flow cooling in electronic devices.

BACKGROUND OF THE INVENTION

Laptop computers and other electronic devices can suffer from cooling problems caused by the obstruction of intake and/or exhaust ports. This can create overheating problems. However, the layout of a typical laptop, for example, prevents certain areas, such as the top, from being used since warm air from the exhaust port could be uncomfortable for a user. In order to obtain the proper airflow through a laptop computer, the intake and exhaust must be located in specific places with specific relationships. For example, the intake area must not normally be covered, such as by the users hands or palms resting on the top, near or above the keyboard section. Further, the air input port must not cc so large as to potentially allow warm exhaust air to be drawn back into the laptop device through the intake port.

Similar problems exist with the exhaust ports. Exhausted not air must not be directed into an area where a user's body, including fingers on the keyboard, or the user's lap, would normally be located. Standard solutions include placing ports on the sides of the device, utilizing cross-draft cooling, or having the input, ports on the bottom of the laptop with exhaust on the side.

Laptop computers are highly restricted as to available space for openings for intake of cooling air and exhaust of warmer air. When the openings are located on the back or sides of the laptop computer, they cannot be so large that they take up space needed for connectors such as USB ports, external video, network, card readers and the like. If the openings are on the bottom and they may create discomfort for a user who places the laptop computer on their lap. Another problem arises if the location of the air input or output ports results in a blockage of a cooling or heat dissipating air flow. As laptop computers become thinner, being able to adapt to possible problems with blockage of intake and exhaust ports on the bottom of the laptop will become more significant.

The state of the art for laptop cooling has primarily been limited to temperature responsive cooling, such as increasing fan speed or number of active fans, in response to component temperatures, or the use of alternative and external, cooling devices. Increasing airflow may increase the problems created by the existing airflow, or fail to achieve any results due to a blocked intake or exhaust port, such as if a user has rested their laptop on their lap. Some existing systems attempt to resolve the problem of side or bottom air exhaust by moving the "radiator" to the flip-up monitor, but at the expense of increasing the size of the laptop.

Therefore, it would be advantageous to have a method and device which would relieve the heat concentration problem which may be created in electronic devices when air flow is blocked or restricted at one or more air input or output ports.

SUMMARY OF THE INVENTION

A method, programmed medium and system are provided for altering the airflow through an electronic device such as a laptop computer in response to overheating, and feedback about the state of use of a laptop computer. In an exemplary embodiment, a laptop case is constructed such that it has an alternate opening for each intake and/or exhaust port. The primary intake and/or exhaust port is located such that it does not interfere with the user while the laptop is being operated normally. When the BIOS or other hardware monitor detects that an intake and/or exhaust port is potentially blocked, such as by using an airflow detector or additional temperature sensor, the BIOS or other hardware monitor first determines if the laptop is actively being used. If the laptop is not being used when an overheated condition is detected, a predetermined action is taken to change the air input/output air flow through an alternate exhaust path. If the laptop is being used, other actions, in terms of altering airflow, may take place, such as enabling a user to selectively choose a different airflow path from a plurality of airflow paths available within the electronic device being cooled.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
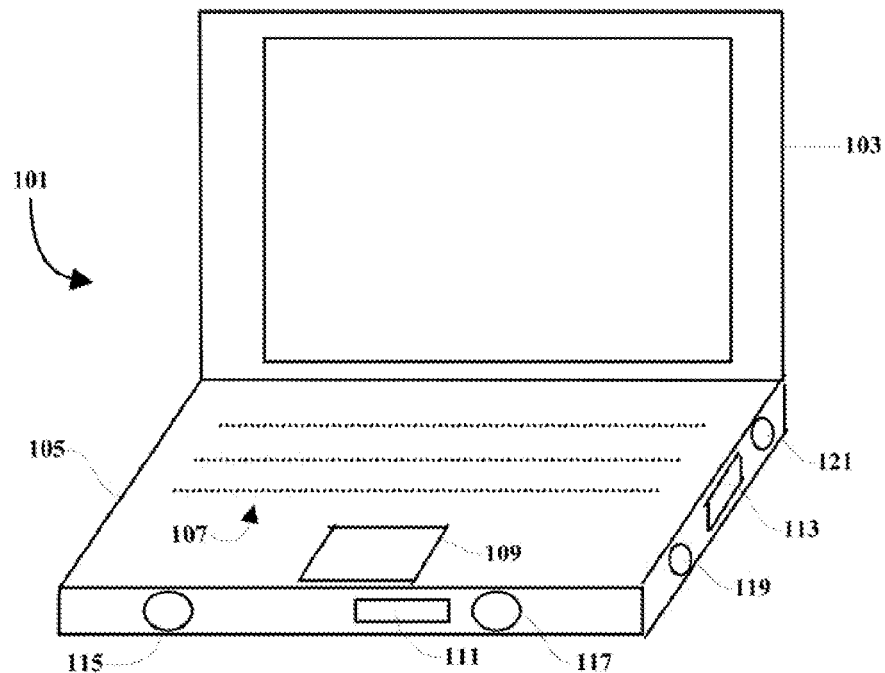
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a laptop computer, it is understood that the present invention may be implemented in any electronic device in which internal heating may occur including, by way of example, cell phones and other personal wireless and/or hand-held devices, including any input device such as keyboards, keypads, pointing devices, touch-sensitive screens or touch-sensitive input pads, to achieve the beneficial functional features described herein.

In the illustrated exemplary embodiment shown in the drawings, the laptop case which includes most of the electronics is constructed such that it has one or more alternate air flow openings or vents for each intake and/or exhaust port or vent. The vents are used to input relatively cool air and exhaust internal compartment hot air which has been heated by the operation of the electronics inside the compartment. The primary intake and/or exhaust port would be ideally located such that it does not interfere with the user while the laptop is being operated normally. When the BIOS or other hardware monitor detects that an intake and/or exhaust port is potentially blocked, such as by using an airflow detector or additional temperature sensor, the BIOS or other hardware monitor then determines if the laptop is actively being used, and if not, an actuator moves louvers such that the primary intake and/or exhaust port is closed, and the alternate intake and/or exhaust port is opened. The louvers over a vent or port may be selectively opened or shut by any of many known means, including but not limited to a servo motor. If the laptop is being used, other actions, in terms of altering airflow, may take place, such as choosing a different port from a plurality of alternative ports or vents.

In one exemplary embodiment, the user is enabled to manually select air flow vents which will be opened and thereby re-direct the intake or exhaust under user control, such that the user was able to press a button, whether physical or on a GUI, and the airflow would be redirected. In this manner, exhaust directed downwardly, onto the lap where air vents are located on the bottom of the laptop, could be directed upwardly or to the side, as desired. Also, output air directed to the side, that might be blowing papers on a desk about, could be redirected downwardly to bottom vents or upwardly through vents which may be located on the top of the laptop casing. It is understood that, although for the sake of simplicity, the present disclosure illustrates exemplary operations using air vents built into the sides of a laptop computer, the present invention may also be implemented using vents which are built into the top or bottom of the laptop electronics casing as well. As used herein, the term "vent" refers to an opening in a compartment casing through which air may be directed to flow either into or out of the casing. Further, the vents may be implemented with controllable louvered openings (not shown) which may be selectively opened or closed to air flow either manually using user input or automatically in response to predetermined conditions using system commands. Further, manual control of the open or closed status of any of the vents may be accomplished by manual setting of hardware switches, gates or louvers covering the vents or openings, or through the use of a software graphical user interface (GUI). In one example, the GUT may present an image of the casing showing the various vents or openings in the casing, and the user would be enabled to "click" on the displayed selected vents which the user wishes to be in an open state. With a touch-sensitive input screen, the user may merely touch a displayed image of the vents which are to remain open and/or closed.

In general, the disclosed system may be implemented by controlling the open/close status of various air vents located in an electronics compartment. For example, in systems where internal, heating is not a severe problem, vents could be placed on top of the compartment and the heated air will naturally rise through the selected open vents without the use of a cooling fan. The present system may also be implemented in systems where cooling fans are already designed into the system and the opening and closing of cooling vents would be able to control, the air flow through the electronics compartment.

In the drawings, FIG. 1 illustrates an exemplary environment in which the present invention may be implemented. As shown, a laptop computer 101 includes a display screen 103 and a base unit or electronics compartment 103 the base unit 105 contains a keyboard 107 and a touchpad 109. The base unit or laptop case or compartment 105 contains most of the electronics for the laptop 101 and a substantial amount of heat may be created by the electronic components within the compartment or case 103 during normal operations. To evacuate the heated air from inside the laptop 101, the case or compartment 105, in the example, includes various openings or vents 115, 117, 119 and 121. The vents are placed in the sidewalls of the case or compartment 105 at locations which are not otherwise needed for electrical sockets such as sockets 111 and 113 which may be USB connections and other connection terminals or sockets typically found on laptop computers. Additional vents may be provided on the top and/or the bottom of the case or compartment 105 but are not shown in the drawings. The vents 115-121 in the example include controllable louvered inserts or other blocking devices (not shown) which are selectively controlled to an open state to allow air flow therethrough or to a closed state to block air flow therethrough. By controlling the open/closed status of the vents 115-121, the air flow and therefore the evacuation of heated air from within the case 105, is controlled. For example, an internal fan within the case 105 will create pressure within the case 105 which will force an air flow (AF) of heated internal air to the outside of the case 105 depending upon which vents are open and which are closed. Each of the vents 115-121 has a corresponding vent (not shown) on the opposite side of the case 105. The vents need not be symmetrically placed but may be located on a space-available basis so as not to interfere with the location of electrical terminal sockets, although where several locations are available, the vents should be placed relatively near to the higher heat generating components within the case 105.

Figure 2:
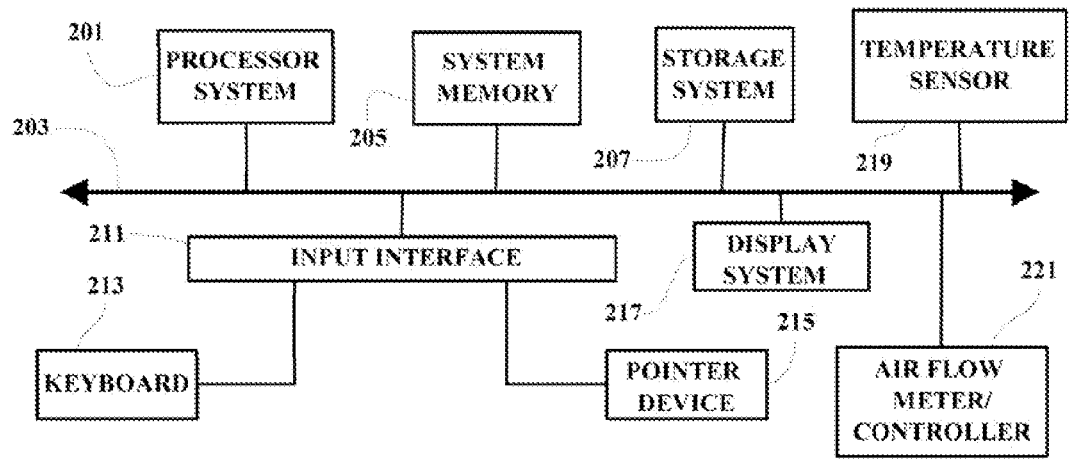
FIG. 2 is a block diagram showing several of the major components of an exemplary computer system or device using the present invention.

FIG. 2 illustrates several of the major components of a computer system which may be used in the illustrated example. As shown, a processor system 201 is connected to a main bus 203. The main bus 203 is also coupled to, inter alia, system memory 205, a local storage system 207, and an input interface 211. The main bus is also connected to a display system 217. As shown, the input interface 211 receives user input through a keyboard 213 and/or a pointer device 215 such as a mouse. The input and/or display system may also comprise a touch-sensitive display screen as an input device. Additional, devices and bus systems, which are not shown, may also be coupled to the system main bus 203.

Figure 4:
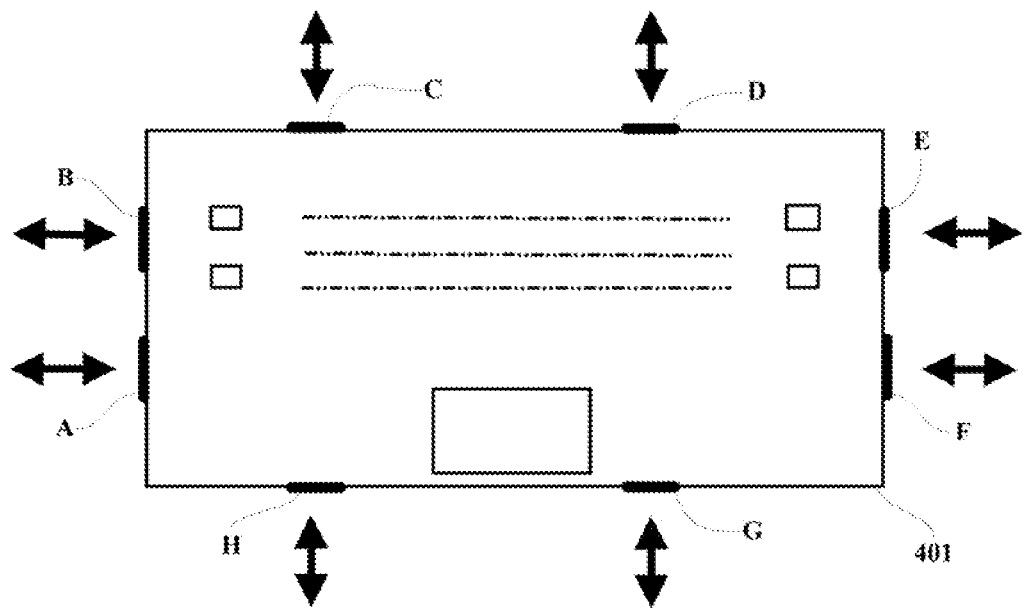
FIG. 4 is an illustration of an exemplary air vent configuration in one embodiment, of the disclosed system.

As shown in FIG. 2, the system also includes a temperature sensor 219 and an air flow meter and controller 221. The temperature sensor 219 may be located within the case to sense the temperature at critical points where over-heating is more likely to occur and/or cause an damage to the system. The air flow meter and controller 221 is also positioned within the case 105 in a location to detect and measure air flow (AF) within the case 105. The AF meter and controller is connected to the temperature sensor 219 and is also connected to the plurality of air vents such that when a predetermined high temperature is detected or when an air flow blockage at one or more of the vents is detected, appropriate ones of the vents may be opened or closed to resolve the problem. As is hereinafter explained in greater detail, the air flow control may be accomplished either automatically in an automatic mode or manually in a manual mode, and may be implemented in the manual mode either through the use of hardware devices or switches or through the use of a graphical user interface (GUI) which may be presented in a pop-up window for example on the display 103. A GUI for example may display an image of the case 401 and the vents A-H as shown in FIG. 4, and the user would be enabled to select which vents A-H are to be open and which are to be closed. In this manner, a user is enabled to change the vents from which the heated case air is vented to the outside in situations where the vent exhaust is uncomfortable to the user as when the heated air is exhausting from vents 115 and 117 toward the user. The user may also change the air flow path if one or more of the vents is blocked and a low air flow is detected.

Figure 3:
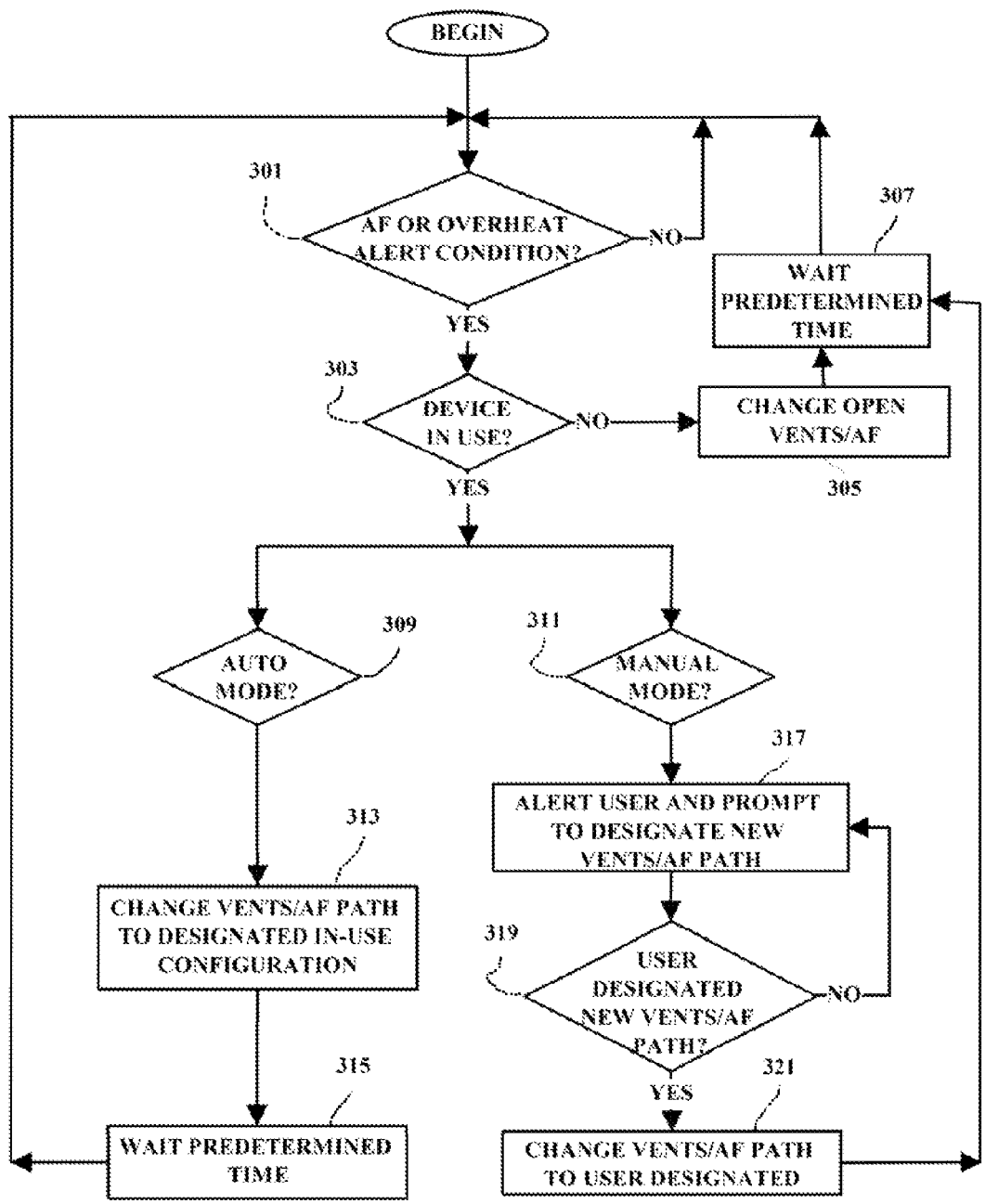
FIG. 3 is a flow chart illustrating an operational sequence in an exemplary implementation of the present system.

In FIG. 3, there is shown a flow chart illustrating an operational sequence in an exemplary implementation of the present system. As shown, when the system detects an air flow blockage or over-heat condition 301, a check is made to determine if the device being monitored is in use 303. The "in use" status of the laptop can be determined, inter alia, by monitoring keystrokes or mouse movements or through the use of sensors to detect the presence of a user in close proximity to the keyboard or vents 115 and 117. If the device or laptop computer is not in use 303, appropriate predetermined air flow (AF) vents are opened and other vents closed 305 to change the air flow patterns within the monitored device. After a predetermined time has passed 307 to allow the changed vents to have an effect, the system is again checked for a blockage or over-heat condition 301. If no blockage or over-heat condition is sensed 301 the process will continue to monitor for such a condition and automatically take corrective action as noted.

If the monitored device, which in the present example is a laptop computer 101, is determined to be in use 303, and the system is in an "auto" mode 309, the system automatically changes 313 which vents are open and which are closed, in accordance with a predetermined pattern based on an assumption that the user is behind the keyboard 107 in a position to view the display 103. For example, if an overheat or air flow blocking condition is detected and the hot compartment air is being exhausted toward the user from vents 115 and 117, the vents 115 and 117 are closed and vents 119 and 121 are opened to exhaust the hot air to the side instead of toward the user. After a predetermined period of time 315, the system is again checked 301 to determine if the new combination of opened and closed vents has corrected the over-heat or blocked condition.

Through a hardware or software switch (not shown), the user is enabled to switch between the "auto" mode and the "manual" mode for monitoring over-heat or blocked air flow conditions within the laptop electronics compartment 105. If the device alert system is in the manual mode 311 when an over-heat or blockage condition is detected 301 and the laptop is determined to be in use 303, then the user is alerted of the over-heat or blockage condition 317 and the user is prompted to designate a new air flow path by changing which vents are open and which are closed. The alert signal to the user may be in one or more of many available audio and/or video alerting techniques. In one example, a pop-up window may appear on the display with an image of the computer base unit 105 and showing the locations of the controllable vents and the user is enabled to select which vents are open and which are closed. After being alerted, the user can visually inspect the area where the laptop is being used and determine if there is a blockage. For example, a user will be able to determine if there is a book, paper stack or airline seat-back next to an intake or exhaust vent, or if the user's body is actually blocking one or more of the vents while operating the laptop. In any case, the user is then enabled to designate a new air flow path by changing which vents are open and which are closed to avoid the blockage or over-heat problem. As hereinbefore noted, this may be accomplished by manually opening or closing a hardware shutter switch (not shown) on each vent selectively, or through a software implementation by designating which of the electronically-controllable vents are to be open and which are to closed in order to avoid a problem which may have been observed by the user. For example, if the back of an airline seat is blocking an exhaust vent at the rear of the laptop, the user is able to actively close the back vents and open the side vents to avoid the observed blockage condition. After the user has designated a different air flow path 319 to exhaust the hot air from the laptop base unit 105 and the designated air flow pattern is changed 321, a predetermined time period is allowed to pass 307 before the system is again checked 301 to determine if the alert condition is still present.

FIG. 4 illustrates a laptop base unit 401 including an exemplary configuration of eight input and output air vents which are designated "A" through "H". There may be any number of air vents in any of many configurations depending upon the particular application and over-heating potential of the electronic components. Each of the air vents may be selectively opened and closed and the vents are able to accommodate air flow in either direction as shown.

Figure 5:
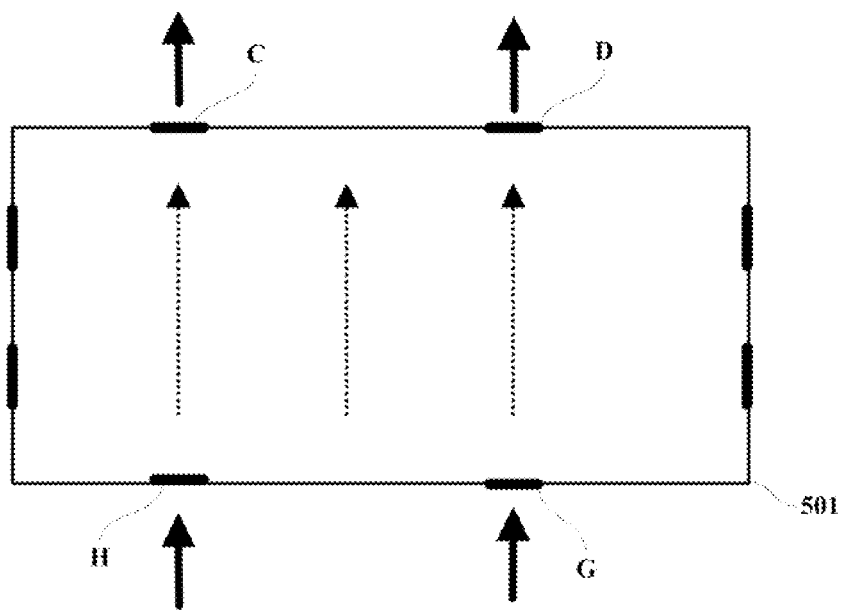
FIG. 5 is an illustration of one exemplary air flow implementation.

FIG. 5 illustrates a condition in which vents H, G, C and D of base unit 501 are open and the air flow comes into the compartment from the front of the unit through vents H and G and exhausts the hot air through the back of the unit through vents C and D. The remaining vents in the illustration are closed to prevent air flow.

Figure 6:
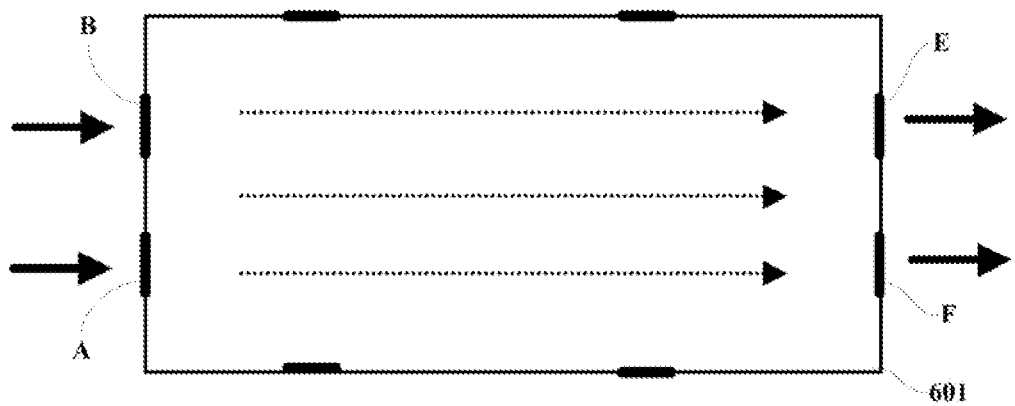
FIG. 6 is another illustration of an exemplary air flow implementation of the disclosed system.

FIG. 6 illustrates a condition in which vents A, B, E and F of base unit 601 are open and the air flow comes into the compartment from the left side of the unit through vents A and B and exhausts the hot air through the right, side of the unit through vents E and F. The remaining vents in the illustration are closed to prevent air flow. As earlier noted, if a user is blocking air flow from the front to the rear of the base unit as shown in FIG. 5, the user is enabled to change the open/closed vent, configuration as shown in FIG. 6 so that the air flow occurs from left to right through the base unit 601 thereby avoiding an air flow blockage condition.

Figure 7:
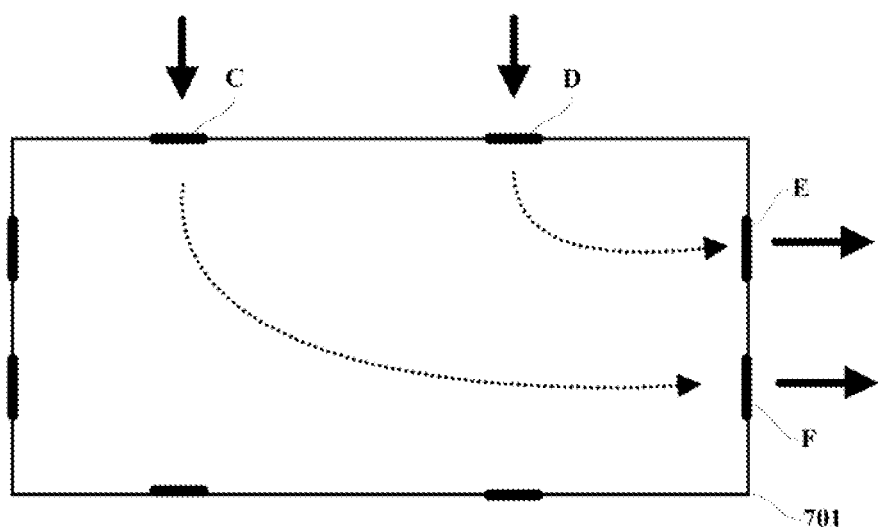
FIG. 7 is another illustration of an exemplary air flow implementation of the disclosed system.

It is noted that the user is also enabled to change the air flow through selected vents to accomplish ventilation along different air flow paths. This is illustrated in FIG. 7 where vents C, D E and F are open and the remaining vents are closed to accomplish a different air flow through the base unit 701 as shown. For example, the pattern shown in FIG. 7 may be desirable where the left side of the laptop must be placed next to a bulkhead or other potentially blocking object.

In another example, for devices which include a fan or other air-moving device inside of an electronics compartment, the vent system herein disclosed may also be coupled to the fan system such that the user is also able to even better control, either manually or automatically, the air flow direction and speed within an electronics compartment in order to exhaust heated air and avoid over-heating conditions which may adversely affect the electronic components within the compartment. In yet another example, the number of vents or ports that are opened or closed may be related to a cooling fan speed within the electronics compartment, i.e. the number of vents that are opened may be determined, at least in part, by a cooling fan speed or the cooling fan speed may be determined, at least in part, by the number of vents or ports that are opened. Further, the fan speed and/or the number of vents that are opened may also be determined, at least in part, by a detected temperature differential between the temperature within the electronics compartment and the temperature of the air outside of the electronics compartment.

It is understood that the flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart, illustration, and combinations of blocks in the block diagrams and/or flowchart illustration, can be implemented by special purpose hardware-based systems that perform the specified functions or acts, or combinations of special purpose hardware and computer instructions.

It is further understood that the specific example presented herein is not intended to be limiting since the functional combinations disclosed herein may be implemented in many different environments and applications.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and input pads. Accordingly, the present invention is not intended to be limited to the specific form set forth herein, but on the contrary, it is intended to cover such alternatives, modifications, and equivalents, as can be reasonably included within the spirit and scone of the invention.

What is claimed is:

1. A method for changing air flow paths in a compartment containing a plurality of electronic components, said compartment containing a plurality of air vents, said air vents being selectively controllable to an open state or a closed state, said air vents being controllable to selectively allow air flow between different ones of said air vents within said compartment and air outside of said compartment, said air flow being along selectively different air flow paths within said compartment, said method comprising:
   detecting a predetermined condition relative to air within said compartment, said predetermined condition being a low level air flow below a predetermined level of air flowing through at least a first one of said air vents; and
   changing a state of one or more of said air vents in response to said detecting to accomplish air flow between different ones of said air vents along different air flow paths within said compartment to compensate for said low level air flow through said first one of said air vents.

2. The method as set forth in claim 1 wherein said changing is accomplished automatically in response to said detecting.

3. The method as set forth in claim 1 wherein said changing is accomplished manually by a user in response to said detecting, said method further including alerting said user when said predetermined condition is detected.

4. The method as set forth in claim 3 wherein said user is enabled to select which of said air vents are opened and/or closed in response to said detecting of said predetermined condition.

5. The method as set forth in claim 1 wherein said predetermined condition further includes temperature of air within said compartment.

6. The method as set forth in claim 1 wherein said predetermined condition further includes an air flow condition within said compartment.

7. The method as set forth in claim 1 wherein said predetermined condition further includes a predetermined temperature differential between air inflow and air outflow from said compartment.

8. The method as set forth in claim 1 wherein multiple ones of said vents are opened simultaneously in response to said detecting of said predetermined condition.

9. The method as set forth in claim 1 wherein a number of said vents which are opened is related to fan speed of a cooling fan for said compartment.

10. A computer program product comprising a computer-readable, tangible storage device(s) and computer-readable program instructions stored on the computer-readable, tangible storage device(s) for changing air flow paths in a compartment containing a plurality of electronic components, said compartment containing a plurality of air vents, said air vents being selectively controllable to an open state or a closed state, said vents being controllable to selectively allow air flow between different ones of said air vents within said compartment and air outside of said compartment, said air flow being along selectively different air flow paths within said compartment, the computer-readable program instructions, when executed by a processing system, being operable for implementing a method comprising:
   detecting a predetermined condition relative to air within said compartment, said predetermined condition being a low level air flow below a predetermined level of air flowing through at least a first one of said air vents; and
   changing a state of one or more of said air vents in response to said detecting to accomplish air flow between different ones of said air vents along different air flow paths within said compartment to compensate for said low level air flow through said first one of said air vents.

11. The computer program product as set forth in claim 10 wherein said changing is accomplished automatically in response to said detecting.

12. The computer program product as set forth in claim 10 wherein said changing is accomplished manually by a user in response to said detecting, said method further including alerting said user when said predetermined condition is detected.

13. The computer program product as set forth in claim 12 wherein said user is enabled to select which of said air vents are opened and/or closed in response said detecting of said predetermined condition.

14. The computer program product as set forth in claim 10 wherein said predetermined condition further includes temperature of air within said compartment.

15. The computer program product as forth in claim 10 wherein said predetermined condition further includes an air flow condition within said compartment.

16. The computer program product as set forth in claim 10 wherein said predetermined condition further includes a predetermined temperature differential between air inflow and air outflow from said compartment.

17. The computer program product as set forth in claim 10 wherein multiple ones of said vents are opened simultaneously in response to said detecting of said predetermined condition.

18. The computer program product as forth in claim 10 wherein a number of said vents which are opened is related to fan speed of a cooling fan for said compartment.

19. A system for changing air flow paths in a compartment containing a plurality of electronic components, said system comprising:
- a compartment containing a plurality of air vents, said air vents being selectively controllable to an open state car a closed state, said vents being controllable to selectively allow air flow between different ones of said air vents within said compartment and air outside of said compartment, said air flow being along selectively different air flow paths within said compartment;
- a detecting device for detecting a predetermined condition relative to air within said compartment, said predetermined condition being a low level air flow below a predetermined level of air flowing through at least a first cine of said air vents; and
- a control device for changing a state of one or more of said air vents in response to said detecting to accomplish air flow between different ones of said air vents along different air flow paths within said compartment to compensate for said low level air flow through said first one of said air vents.

20. The system as set forth in claim 19 wherein said predetermined condition is a predetermined combination of temperature and air flow within said compartment.

\* \* \* \* \*